United States Patent
Gerbaulet et al.

(10) Patent No.: US 9,592,953 B2
(45) Date of Patent: Mar. 14, 2017

(54) POD AND PACKAGE FOR PREPARING A BEVERAGE BY CENTRIFUGATION

(75) Inventors: Arnaud Gerbaulet, Oye et Pallet (FR);
Daniel Abegglen, Rances (CH);
Alexandre Perentes, Lausanne (CH);
Jean-Francois Tinembart, Yverdon (CH)

(73) Assignee: Nestec S.A., Vevey (CH)

( * ) Notice: Subject to any disclaimer, the term of this patent is extended or adjusted under 35 U.S.C. 154(b) by 761 days.

(21) Appl. No.: 13/982,142

(22) PCT Filed: Jan. 10, 2012

(86) PCT No.: PCT/EP2012/050270
§ 371 (c)(1),
(2), (4) Date: Jul. 26, 2013

(87) PCT Pub. No.: WO2012/100975
PCT Pub. Date: Aug. 2, 2012

(65) Prior Publication Data
US 2013/0323366 A1    Dec. 5, 2013

(30) Foreign Application Priority Data

Jan. 27, 2011   (EP) .................................... 11152383

(51) Int. Cl.
*B65D 85/804* (2006.01)
*A47J 31/22* (2006.01)

(52) U.S. Cl.
CPC .......... *B65D 85/8046* (2013.01); *A47J 31/22* (2013.01); *B65D 85/8043* (2013.01)

(58) Field of Classification Search
CPC ............. B65D 85/8043; B65D 85/8046; A47J 31/407; A47J 31/22
See application file for complete search history.

(56) References Cited

U.S. PATENT DOCUMENTS

2007/0259073 A1* 11/2007 Scarchilli ........... B65D 85/8043
426/78
2009/0205504 A1   8/2009 Navarro Alcantara

FOREIGN PATENT DOCUMENTS

| CN | 101678951 | 3/2010 |
| FR | 2617389 | 1/1989 |
| WO | WO2006037062 | 4/2006 |
| WO | WO2008148650 | 12/2008 |
| WO | WO2010066705 | 6/2010 |

OTHER PUBLICATIONS

Chinese Office Action for Application No. 201280006566.4 dated Sep. 29, 2014.

* cited by examiner

Primary Examiner — Erik Kashnikow
Assistant Examiner — Chaim Smith
(74) Attorney, Agent, or Firm — K&L Gates LLP

(57) ABSTRACT

Pod for the preparation of a beverage in a centrifugal brewing device by feeding liquid through said pod and rotating the pod along a rotating axis "I" in the device to produce centrifugal forces on the liquid traversing the pod thereby forcing a beverage out of the pod by such centrifugal forces, wherein the pod comprises containment walls containing beverage ingredients; said containment walls being essentially made of porous filtering material and comprising a top wall from which a central funnel (10) comprising liquid inlet openings extends inwardly in the pod.

19 Claims, 3 Drawing Sheets

POD AND PACKAGE FOR PREPARING A BEVERAGE BY CENTRIFUGATION

CROSS REFERENCE TO RELATED APPLICATIONS

The present application is a National Stage of International Application No. PCT/EP2012/050270, filed on Jan. 10, 2012, which claims priority to European Patent Application No. 11152383.3, filed Jan. 27, 2011, the entire contents of which are being incorporated herein by reference.

FIELD OF THE INVENTION

The present invention relates to the field of portioned beverage using pods or portioned packages for preparing a beverage in a beverage brewing device.

BACKGROUND ART

The preparation of a beverage by a single-portioned package containing beverage ingredients is known. In general, the package is inserted in a beverage production device, such as a coffee machine, liquid is fed in the package, the liquid interacts with the beverage ingredients and a beverage is extracted from the package under pressure or by gravity.

For example, WO 2006/037062 relates to a liquid infusion pod containing insoluble materials such as a creamer. The pod comprises a fluid distribution member taking the form of an injection nozzle protruding inside the pod. The pod further comprises a filter member having two regions of different permeability. The pod is so designed to promote retention of insoluble materials without clogging. However, such pod is not adapted for the centrifugal brewing of a beverage such as coffee.

FR2617389 relates to a cartridge for preparing a beverage comprising porous top and bottom sides. The top side comprises a peripheral edge and a median centering recess. Again, such cartridge is designed for use in a traditional coffee brewer wherein liquid traverses the pod from the top side to the bottom side.

The preparation of a beverage by using the centrifugation is known. The principle mainly consists in providing beverage ingredients in a container of the package, feeding liquid in the package and rotating the receptacle at elevated speed to ensure interaction of liquid with the ingredients while creating a gradient of pressure of liquid in the package; such pressure increasing gradually from the centre towards the periphery of the package. As liquid traverses the ingredients, e.g., ground bed, extraction of the beverage compounds takes place and a liquid extract is obtained that flows out at the periphery of the package.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system and method for preparing a beverage from a capsule using centrifugation forces is described in the following documents: EP2210539, WO2008/148604, WO2008148650, WO2008/148646, WO2008/148656 and WO2010/026045.

It is known to use a capsule in a beverage brewing device using centrifugation wherein a closure wall of the capsule is removed or perforated for enabling insertion of a liquid injection means and/or beverage extracting means.

However, there is a need for a package solution providing an improved flow distribution in the beverage ingredients and which may be produced easily and inexpensively.

SUMMARY OF THE INVENTION

In a first aspect, the invention relates to a pod for the preparation of a beverage in a centrifugal brewing device by feeding liquid through said pod and rotating the pod along a rotating axis in the device to produce centrifugal forces on the liquid traversing the pod thereby forcing a beverage out of the pod by such centrifugal forces, wherein the pod comprises containment walls containing beverage ingredients; said containment walls being essentially made of porous filtering material and comprising a top wall from which a central funnel comprising liquid inlet openings extends inwardly in the pod.

The term "essentially made of porous filtering material" means in the context of the invention that at least 75%, preferably at least 90%, of the surface of the containment walls comprises porous filtering material.

Preferably, the top wall comprises a beverage outlet region extending at the periphery of the top wall for the beverage to leave the pod during centrifugation. More preferably, the top wall also comprises a liquid impervious region between the beverage outlet region and the funnel.

The containment walls preferably consist of a substantially conical sidewall, a bottom wall and top wall of larger cross-section than the bottom wall.

The pod of the invention is therefore designed by way of its funnel to improve the liquid distribution in the pod through the beverage ingredients. In particular, the pod is configured to receive an injection system (such as in the form of a needle or lance) without being perforated; such injection system injecting liquid below the top surface of the pod and said liquid being able to migrate across a larger thickness of ingredients by effect of the centrifugal forces. The larger top wall of the pod also promotes a privileged direction of the flow, in particular both upwardly and outwardly, thereby ensuring a complete wetting of the ingredients by liquid.

Preferably, the porous material is fabric and/or filter paper.

In a mode, the containment walls are formed of fabric. More preferably, the funnel is also formed of fabric thereby providing a multitude of inlet openings in the pod for the liquid. The fabric may be a woven or a non-woven fabric.

The porous filtering material has preferably an elongation at break which is comprised between 250% preferably at least 300%. Preferably, the said elongation at break is comprised between 280% and 1000%, most preferably between 300% and 500%. The elongation at break is determined by the standard DIN EN 29073-3, in particular, "Textiles; test method for nonwovens; part 3: determination of tensile strength and elongation".

Resulting from such elongation, the capsule is provided with a dedicated filtering area positioned in a strategic area where the centrifugal forces are maximal; such area being designed to stretch without rupturing when engaged by the perforating (extraction) elements of the device when the capsule is inserted in the beverage preparation device but also resisting to the pressure of liquid exerted from the inside of the capsule. The characteristic of the material is such that a filtering of the beverage is guaranteed and the risk of creating large cracks in the material is prevented.

The fabric has preferably a weight per unit area comprised between 100 and 300 gram/m$^2$, most preferably between 140 and 300 gram/m² (DIN 53854). The weight per unit area influences the beverage flow resistance and the filtering properties. The denser the fabric is, the greater the resistance to the flow is. A higher flow resistance directly increases the pressure gradient in the capsule and therefore provides in particular better coffee extraction results (i.e., higher total solids and yield values).

In particular, the fabric is a melt-blown or spun-bond fabric. Preferably, the fabric is made of a material selected from polyurethane, polyethylene, polypropylene, copolymers of polyethylene, copolymers of polypropylene, polyester and combinations thereof. Melt blowing (MB) is known as a process for producing fibrous webs directly from polymers or resins using high-velocity air or another appropriate force to attenuate the filaments. This process is used almost exclusively to produce microfibers rather than fibers the size of normal textile fibers. MB microfibers generally have diameters in the range of 2 to 4 μm, although they may be as small as 0.1 μm and as large as 10 to 15 μm.

Most preferably, the fabric material is preferably polyurethane elastomer or polyolefin plastomer. Preferred polyeolefin plastomer is ethylene alpha olefin copolymers such as EXACT™ produced by ExxonMobil Chemicals or AFFINITY® produced by The Dow Chemical Company or polypropylene elastomer such as VISTAMAXX™ produced by ExxonMobil Chemicals. These polymers have elastomeric properties. VISTAMAXX™ are polyolefin elastomers with isotactic polypropylene crystallinity and contains a predominant amount of polypropylene (more than 80%) with isotactic polypropylene crystallinity, with the balance of the composition being ethylene and other alpha-olefins. They are highly elastic. The elastomer has an elasticity which is related to the molecular weight and composition. The lower the crystallinity and the higher the molecular weight, the higher the elasticity of the fabric. In particular, melt-blown elastomers provides an elongation which may be of about 300-500%.

Polyester comprises crystallized or semi-crystallized PET (cPET), crystallized or semicrystallized polylactic acid (cPLA) PET (polyethylene terephtalate), PLA (polylactic acid) and combinations thereof.

The fabric material may be formed of multi-layers of different polymers such a layer promoting the sealing of the fabric to form the pod and a layer promoting the beverage filtering or water repellent properties.

When woven, the mesh size depends on the size of the particles of the ingredients contained in the pod to ensure retention of said particles inside the pod both before and after brewing, in particular, for ground coffee powder. Therefore, the mesh size is smaller than the average particle size of the beverage ingredients. Preferably, the mesh size is smaller than 200 microns, more preferably, it is comprised between 10 and 100 microns.

The containment walls can be formed of a cup-based part and a top lid sealed together at a flange. The two parts are essentially formed of fabric. Depending on the composition of the fabric, the funnel may be an integral part of the lid. Preferably, the funnel is a part of the lid and the lid is thermoformed in a selected area corresponding to the funnel area to confer the inwards shape to the funnel. Although it is thermoformed, the funnel remains at least partially porous to liquid in order to ensure that liquid injected in the funnel can traverse through the fabric.

The funnel has preferably a depth shorter than the depth of the cup-based part. This characteristic enables to optimize the volume available for the ingredients in the pod whereas it provides an improved liquid distribution with the assistance of the centrifugal forces, in particular, at 360 degrees, inside the pod. Therefore, the funnel has preferably a porous bottom end also made of said fabric. The porous end enables the distribution of liquid across the whole thickness of the mass of ingredients and consequently avoids non-wetted zones of ingredients. In a less preferred alternative, the funnel can be designed to traverse the pod from the top surface to the bottom surface.

In order to properly guide liquid during centrifugation, the lid has an internal surface which is made impervious or hydrophobic to liquid in an annular or circular area which starts from the funnel to an outer limit of the lid which ends before the sealed flange (as later referenced as "liquid impervious or hydrophobic area"). An hydrophobic surface refers to a surface having a contact angle of 90° or higher. Therefore, since the beverage ingredients are compacted during the centrifugation against the peripheral walls of the pod, liquid injected from the funnel is forced to flow up to the periphery of the lid and is therefore prevented from bypassing the beverage ingredients by leaving the pod too near from the centre of the pod. Therefore, the liquid-impervious or hydrophobic area is larger than the remaining porous annular area beyond said limit in the direction of the sealed edge of the pod corresponds to the axis of rotation. The remaining porous area can be made of the fabric or of a perforated portion of foil positioned adjacent to the lid or replacing it.

In particular, the remaining porous annular area of the lid is comprised between 3 and 15 mm, more preferably between 4 and 10 mm. This relatively well delimited liquid porous area enables to guide the beverage off the pod in the area of larger pressure of fluid, i.e., where the centrifugal forces are maximal by virtue of the maximal outer section of the pod. Therefore, a proper gradient of pressure can be maintained in the pod which is appropriate for a good beverage extraction.

The liquid-impervious annular area can be obtained by closing the pores or interstices of the fabric such as heat treatment such as by-thermofusing. The liquid-impervious annular area can also be obtained by sealing a liquid impervious annular foil or disc to the fabric. The foil or disc may be sealed on the outside surface or on the inside surface of the fabric's wall. The foil or disc may be aluminum, plastic, thin metalized biodegradable polymer and combinations thereof. Preferably, the material for the foil or disc is compatible to sealing with the material of the fabric. Most preferably, the two are made of the same material.

The pod may be filled with various beverage ingredients such as ground coffee, soluble coffee, leaf tea, herbal tea, soluble tea, cocoa powder, milk powder, nutritional formula powder and combinations thereof. However, preference is given to ground coffee as the main ingredients. Preferably, the pod is filled with ground coffee powder having a means diameter ($D_{4,3}$) comprised between 150 and 650 microns. The ingredients are preferably placed in the pod in loose form. The pod is preferably filled with the ingredients with no significant headspace. The dose of ingredients may vary of from 3 to 20 grams and depends on the volume of the beverage and other common beverage attributes such as its aroma or taste intensity.

The invention further relates to the use of a pod as aforementioned in a centrifugal brewing device in which the pod is rotated around along its rotating axis to produce the centrifugal forces.

The invention further relates to a beverage portioned package comprising a container and the aforementioned pod packed therein.

The container can be used to store the pod individually. In particular, it may be gastight so that the beverage ingredients are isolated from the ambient air. Furthermore, the container is sealed under gas controlled conditions to protect the ingredients against oxidation. In particular, the container contains inert gas such as nitrogen and/or carbon dioxide. Such inert gas may be added in the pod and/or may come from natural degassing of the beverage ingredients, such as $CO_2$ coming from freshly ground coffee powder.

The container may comprise a rigid supporting cup for lodging the pod therein and a sealing membrane sealed to the cup for closing the container. The sealing membrane can be peelable or perforable.

The invention further relates to a method for preparing a beverage in a centrifugal brewing device by use of a pod as previously defined, wherein:
the pod is inserted in the beverage brewing device,
the pod is centrifuged in the device causing beverage to be released from at least one annular liquid-pervious area of the top wall of the pod.

Moreover, the beverage can be furthermore released from the liquid-pervious sidewall of the pod. Moreover, beverage is prevented from the pod being released from a liquid-impervious area situated between the annular liquid-pervious area of the top wall and the funnel.

The invention further relates to a method for preparing a beverage in a centrifugal brewing device by use of said portioned package, wherein:
the sealing membrane of the container is removed before insertion of the package in the device or perforated by insertion of the package in the device,
the pod remains supported in the supporting cup of the container during centrifugation in the device,
a liquid extract is released from at least one annular liquid-pervious area of the top wall of the pod.

The present invention is generally defined by the appended claims.

BRIEF DESCRIPTION OF THE DRAWINGS

Additional features of the invention will appear in the detailed description of the figures which follows.

DETAILED DESCRIPTION OF THE DRAWINGS

Figure 1:
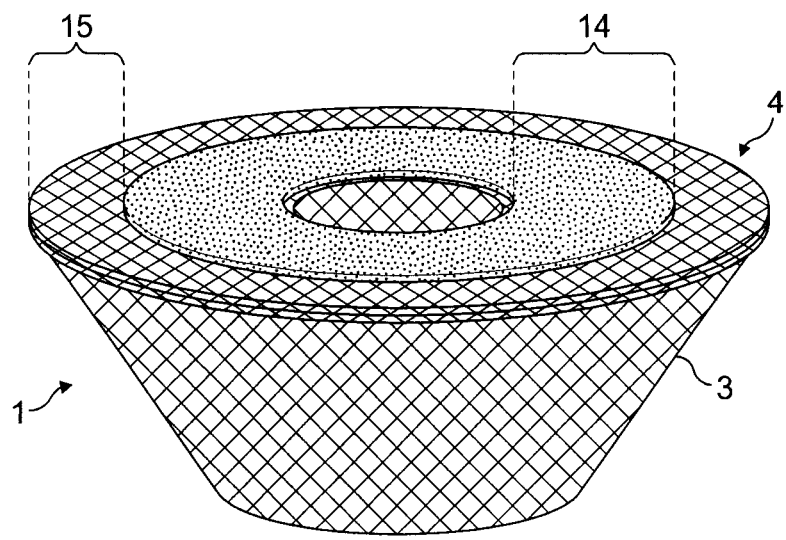
FIG. 1 shows a perspective view of the pod according to the preferred mode of the invention.
Figure 2:
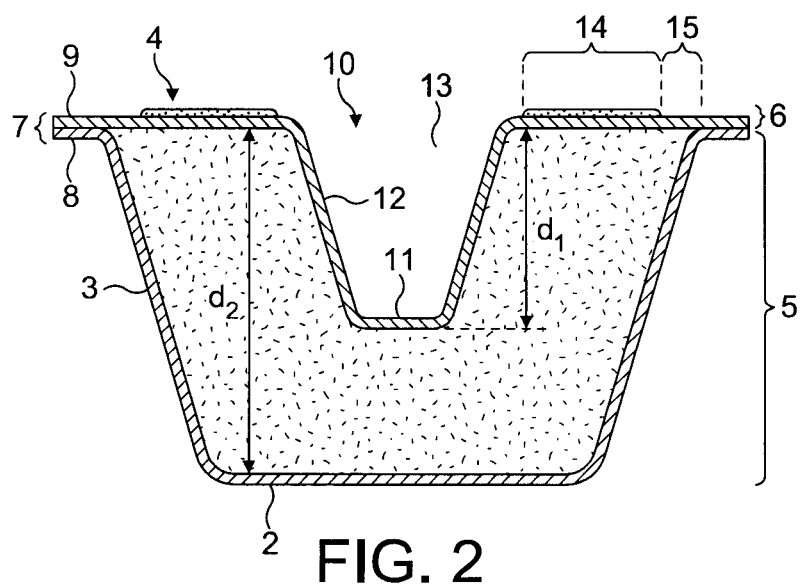
FIG. 2 is a cross-section view of the pod of FIG. 1.

In a first aspect, the invention relates to a pod 1 as illustrated in FIGS. 1 and 2. The pod comprises containment walls, namely, a bottom wall 2, a sidewall 3 and a top wall 4 which are formed of porous filtering materials, preferably a fabric. The bottom wall is preferably of smaller cross section than the top wall so as to promote the flow of liquid upwardly in the pod as a result of the centrifuged forces during the preparation method. The walls of the pod are preferably made of fabric and the walls are assembled to form a sort of containment pocket. For facilitating the assembling of the pod, a cup-shaped body 5 forms the bottom wall and sidewall 3 whereas the top wall 4 is formed at least partially by a lid 6. The body 5 and lid 6 are sealed along a flange 7 constituted by flange portions 8, 9 of the body and lid respectively.

The pod comprises a funnel 10 which extends from the top surface inwards of the pod. In a general manner, the funnel has an open proximal end 13 and a closed terminal end 11 and is delimited by a truncated or cylindrical sidewall 12. Its terminal end 11 is closed by fabric but could also be closed by a liquid-tight portion of disc or foil. Its open proximal end 13 may be larger than or equal to its closed terminal end 11. Therefore, the funnel may have a tapered or cylindrical shape. The depth "$d_1$", as measured between the two ends 11, 13, of the funnel is shorter than the depth "$d_2$" of the body part 5 so that the storage volume for the ingredients remains available between the funnel and the bottom 2. Preferably, the ratio $d_1:d_2$ is comprised between 1:1.1 and 1:4, more preferably 1:1.5 and 1:3.

The beverage ingredients are preferably stored in loose form in the containment walls and preferably occupy in such form between 70 to 100%, preferably nearly 100%, of the internal available volume (not considering the voids created between the particles of the powder).

The lid 6 is further made impervious to liquid in an annular area 14 which starts from the top edge of the funnel (at the open proximal end) and ends before the sealed flange 7 while leaving a liquid pervious area 15. This liquid-pervious area 15 is essentially dedicated for enabling an upward and peripheral release of the centrifuged liquid out of the pod as a result of the centrifugation forces exerted in the pod.

The material for the pod is essentially a polymeric material, in particular, a fabric such as a woven or non-woven fabric. Metal wires may also be used to rigidify the pod. Preferably, the main material for the pod is thermoformable. The funnel may consequently be formed by by applying heat and pressure applied on lid 6. Also, the body and lid can be assembled easily by heat sealing. The liquid-impervious area 14 can be formed by heat fusing the fabric at a temperature causing sufficient melting of the material thereby resulting in the closing of the pores or meshes of the material. The weight per surface unit for the fabric is preferably comprised between 100 and 300 gram/m$^2$ (DIN 53854).

In an alternative, the liquid-impervious area is formed by the addition of an annular disc or foil which is welded (e.g., by heat sealing) onto the fabric of the lid. Preferably the foil or disc is made of the same material (for example, polypropylene and polyethylene copolymer) as the fabric or at least is made of a material which is compatible to sealing with the fabric.

In a possible design, the open end of the funnel 10 can be closed by the foil or disc. In this case, the foil or disc is made circular and of a material that is easy to perforate.

Instead of a liquid-impervious area 14, the same area remains a fabric (woven and/or non-woven) but is treated to become an hydrophobic internal surface. The hydrophobicity may come from the composition of the material constituting the fabric itself or by a surface treatment of the fabric or by a particular structure promoting water repellent properties. For instance, in the annular liquid-impervious area 14, the fabric contains (food approved) hydrophobic molecules such as fats, oils, proteins, alkanes, silicones, fluorocarbon and combinations thereof. This area is generally effective for repelling liquid and avoiding a significant leakage through the hydrophobic wall. The remaining area 15 is made non-hydrophobic to promote unimpeded release of the beverage off the pod via this area.

Considering the body part 5 of the pod, preference is given to use the same fabric as the lid. However, it may be that the fabric is also made hydrophobic in whole or part and/or is covered by a liquid-impervious foil such as a thin metalized polymer. Of course, the fabric for the body part may also be formed of smaller mesh size or higher density (gram-per-square-meter) than the one for the lid to reduce the leakage through the bottom and/or sidewall of the pod.

Figure 3:
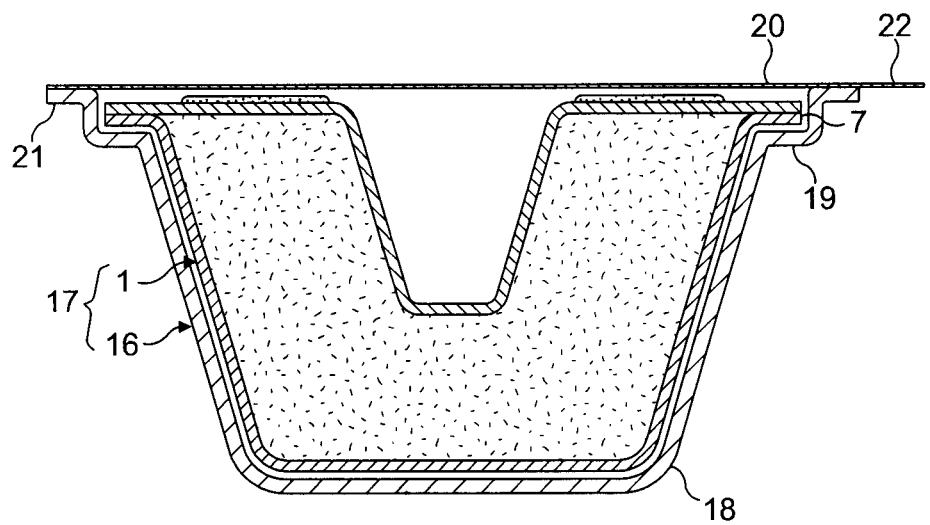
FIG. 3 is a cross sectional view of the package of the invention.
Figure 4:
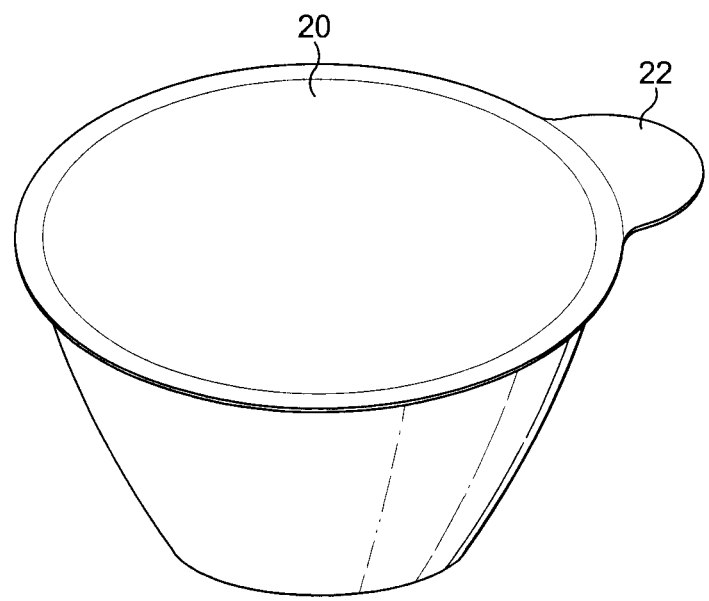
FIG. 4 is a perspective view of the package of FIG. 3.

FIGS. 3 and 4 show the pod 1 enclosed in a container 16 to form together a portioned package 17. The container is preferably made of gas-tight material(s) and sealed in a gas-tight manner to ensure protection of the ingredients in the pod against gas ingress and to prevent the aroma loss outside of the container. The container may be designed in various different forms. In the illustrated form, it has a rigid supporting cup 18 of a size and dimension adapted to receive the pod therein. The cup can have an annular step 19 for supporting the flange 7 of the pod and to ensure that the pod, which is relatively flexible, does not collapse in the container. A sealing membrane 20 is sealed onto the flange 21 of the cup. A tab 22 may further be provided to enable the removal of the membrane by peeling it off. In an alternative, the sealing can be made non-peelable and the membrane is perforated or cut for opening the package.

Figure 5:
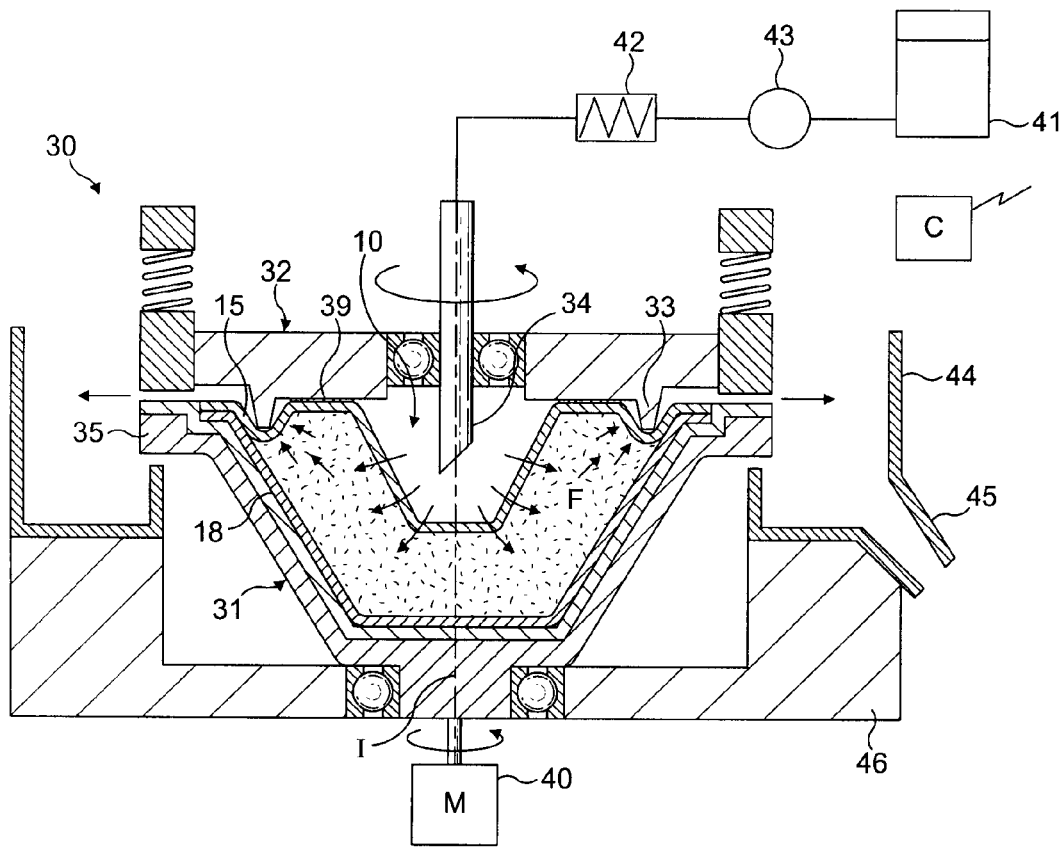
FIG. 5 illustrates a schematic view of a beverage brewing device during the extraction phase with the package of the invention.
Figure 6:
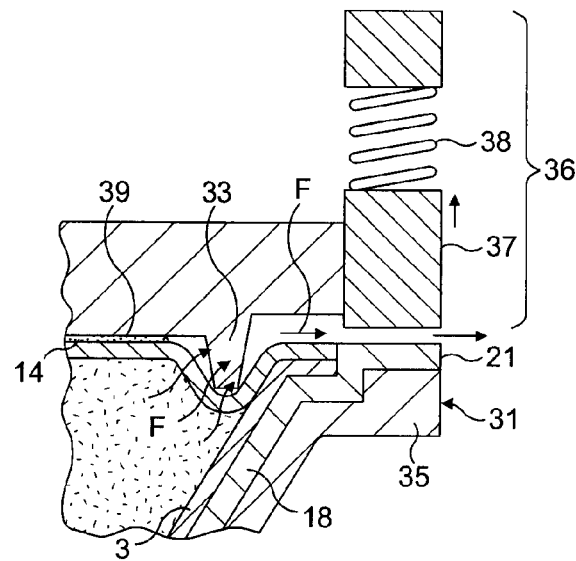
FIG. 6 shows a detail of the extraction conditions through the device.

The operation of the pod 1 or package 17 in a centrifugal brewing device 30 is now described in relation to FIGS. 5 and 6. The pod 1 or package 17 is inserted in the device 30, in particular, in a rotationally mounted capsule holder 31 shaped and dimensioned for properly referencing the cup 18 with its central axis becoming aligned with the rotation axis "I" of the device. It should be noted that the cup 18 could be replaced by any other recipient enabling the support of the pod 1; in which case only the pod 1 can be inserted in the device. It should be noted that the whole package 17 may also be introduced in a closed configuration with its sealing membrane 20 (although the figure shows the package without it).

A liquid interfacing member 32 of the beverage brewing device is engaged relatively to the pod in such a manner to deform the fabric 15 inwardly. The fabric is preferably flexible/stretchable enough to deform without tearing under the pressure exerted by beverage extracting means 33 (such as a series of circumferentially distributed pyramidal-shaped members or blades, spikes, needles and the like). For instance, the fabric is made of elastomeric fibres. However, the fabric area may be also perforated in many peripheral locations by the beverage extracting means 33. Even if perforated, the fabric may be sufficiently dense to intimately engage with the surface of the perforating extracting means 33 that significantly no large particles of ingredients, e.g., coffee grains, is allowed to leave the pod. In case, the sealing membrane is present, these beverage extracting means serve the purpose of making beverage outlets through the sealing membrane.

At the same time, a central injector 34 of the liquid interfacing member 32 is introduced in the funnel 10 of the pod. The liquid interfacing member is also designed with an engaging surface 39 which cooperates in engagement with the annular liquid impervious area 14 of the pod. Such surface 39 can be, for instance, a flat or convex surface. The surface 39 could also be engaged against the sealing membrane 20 in case such membrane is present on the package after its insertion in the device.

The brewing unit formed by the capsule holder 31 and liquid interfacing member 32, both retain the capsule fixedly. In particular, a peripheral pinching part 37 of the liquid interfacing member 32 engages with the flange 21 of the cup of the package. The part 37 can be fixed relative to the liquid interfacing member or, as illustrated, it can be spring-biased to be able to exert a pressure on the flange 21. The flange of the cup becomes pinched between such pinching part and the support part 35 of the capsule holder 31. In the illustrated example, the device comprises a spring-biased valve 36 with a closing ring 37 (forming the pinching part) pressed on the flange 21 by means of a spring 38. The valve thus exerts a closing force onto the flange 21. The valve opens or enlarges, by the ring stressing the spring 38, when the centrifuged beverage (F) exerts a sufficient pressure on the ring 37 (FIG. 6). Protrusions and/or channels can be present at the flange 21 and/or on the pressing surface of the ring for maintaining a certain clearance even at the closing of the valve, for example for facilitating filling of the pod with liquid by the injector and venting the gas contained in the package and/or for controlling a certain leakage at the start of the centrifugation process.

For carrying out the beverage extraction, the brewing unit, and the capsule inserted therein, are both driven at relatively high-speed rotation (e.g., between 500-10000 rpm) along a rotational axis "I" passing through the longitudinal axis of the pod, by means of a rotary motor 40 while liquid is fed in the capsule through the injector 34. Such liquid may be heated water coming from a fluid circuit comprising fresh water reservoir 41 and a liquid heater 42 (e.g., thermo-block, cartridge heater or boiler) by means of gravity or pump 43. As the brewing unit is rotated, the beverage ingredients are compacted on the inner periphery of the containment walls of the pod and liquid traverses the resulting compacted mass and interacts with the ingredients to form a beverage or liquid extract. The funnel 10 facilitates the filling of the cavity with liquid. It also ensures an even distribution of the ingredients in the pod by guaranteeing a relatively constant thickness of ingredients (at any radial location) which is traversed by liquid. The containment walls, in particular, sidewall 3 of the pod may deform due to the nature of the fabric material and conform to the surfaces of the cup 18. The beverage flow finds its way through the porous fabric area 15 and between the flange 21 and force ring 37 pushed upwards. Furthermore, since the sidewall 3 of the pod is also liquid-pervious, some beverage may also traverse the sidewall and is guided upwards by the cup 18. As the valve 36 opens under the centrifugal forces exerted outwardly by the beverage, the beverage is projected against an impact wall of a collector 44 fixedly mounting on a base 46 of the device. The beverage is then collected via a beverage duct 45 for delivering the beverage in a receptacle such as a coffee cup or mug.

The invention claimed is:

1. A pod for the preparation of a beverage in a centrifugal brewing device by feeding liquid through the pod and rotating the pod along a rotating axis in the device to produce centrifugal forces on the liquid traversing the pod thereby forcing a beverage out of the pod by such centrifugal forces, wherein the pod comprises containment walls containing beverage ingredients, the containment walls being essentially made of porous filtering material and comprising a top wall from which a central funnel comprising liquid inlet openings extends inwardly in the pod, wherein the porous filtering material has an elongation at break which is at least 250%.

2. The pod according to claim 1, wherein the top wall comprises a beverage outlet region extending at the periphery of the top wall for the beverage to leave the pod during centrifugation.

3. The pod according to claim 1, wherein the porous filtering material is fabric and/or filter paper.

4. The pod according to claim 3, wherein the fabric is woven and/or non-woven.

5. The pod according to claim 4, wherein the fabric has a weight-per unit-area of between 100 and 300 gram/m$^{2-}$.

6. The pod according to claim 1, wherein the fabric is selected from the group consisting of polyurethane, polyethylene, polypropylene, copolymers of polyethylene, copolymers of polypropylene, polyester and combinations thereof.

7. The pod according to claim 6, wherein the fabric is selected from the group consisting of a polyurethane elastomer, polyolefin plastomer, and polypropylene elastomer.

8. The pod according to claim 7, wherein the lid is liquid-impervious or hydrophobic to liquid in an annular or circular area which starts from the funnel to an outer limit of the lid which ends before the sealed flange.

9. The pod according to claim 8, wherein the liquid-impervious or hydrophobic annular or circular area is larger than the remaining liquid-porous annular area beyond the limit in direction of the sealed flange.

10. The pod according to claim 9, wherein the remaining liquid-porous annular area of the lid is between 3 and 15 mm.

11. The pod according to claim 1, wherein the containment walls are formed of a cup-based body and a relatively flat lid sealed together at flange.

12. The pod according to claim 11, wherein the funnel is integral with the lid.

13. The pod according to claim 11, wherein the funnel has a depth that is shorter than the depth of the cup-based part.

14. A beverage portioned package comprising:
a pod for the preparation of a beverage in a centrifugal brewing device by feeding liquid through the pod and rotating the pod along a rotating axis in the device to produce centrifugal forces on the liquid traversing the pod thereby forcing a beverage out of the pod by such centrifugal forces, wherein the pod comprises containment walls containing beverage ingredients, the containment walls being made of porous filtering material and comprising a top wall from which a central funnel comprising liquid inlet openings extends inwardly in the pod; and
an outer container gas-tightly sealed around the pod, wherein the pod contains inert gas.

15. The package according to claim 14, wherein the container comprises a rigid supporting cup for lodging the pod therein and a sealing membrane sealed to the cup.

16. A method for preparing a beverage in a centrifugal brewing device by use of a pod for the preparation of a beverage in a centrifugal brewing device by feeding liquid through the pod and rotating the pod along a rotating axis in the device to produce centrifugal forces on the liquid traversing the pod thereby forcing a beverage out of the pod by such centrifugal forces, wherein the pod comprises containment walls containing beverage ingredients, the containment walls being made of porous filtering material and comprising a top wall from which a central funnel comprising liquid inlet openings extends inwardly in the pod, the method comprising:
inserting the pod in the beverage brewing device; and
centrifuging the pod in the device causing a liquid extract to be released from at least one annular liquid-pervious area of the top wall of the pod.

17. The method of claim 16, wherein the porous filtering material has an elongation at break which is at least 250%.

18. A method for preparing a beverage in a centrifugal brewing device by use of a beverage package for the preparation of a beverage in a centrifugal brewing device by feeding liquid through the pod and rotating the pod along a rotating axis in the device to produce centrifugal forces on the liquid traversing the pod thereby forcing a beverage out of the pod by such centrifugal forces, wherein the pod comprises containment walls containing beverage ingredients, the containment walls being made of porous filtering material and comprising a top wall from which a central funnel comprising liquid inlet openings extends inwardly in the pod, the method comprising:
removing a sealing membrane of the container before insertion of the package in the device or perforating the sealing member of the container by insertion of the package in the device;
centrifuging the pod while it remains supported in the supporting cup during centrifugation in the device; and
allowing a liquid extract to be released from the at least one annular liquid pervious area of the top wall of the pod.

19. The method of claim 18, wherein the porous filtering material has an elongation at break which is at least 250%.

* * * * *